3,567,655
METHOD OF PRODUCING A LOW-TEMPERATURE CATALYST FOR THE CONVERSION OF CARBON MONOXIDE WITH STEAM
Dimiter S. Shishkov, Diko G. Ivanov, Ivan P. Dombalov, Ganka I. Radoeva, and Radka G. Mishtalova, Sofia, Bulgaria, assignors to Himicheski Kombinat, Vratza, Bulgaria
No Drawing. Filed July 25, 1968, Ser. No. 747,449
Claims priority, application Bulgaria, Aug. 1, 1967, I–1,115
Int. Cl. B01j 11/06, 11/32
U.S. Cl. 252—468                  2 Claims

ABSTRACT OF THE DISCLOSURE

A catalyst for the gas-phase reaction of carbon monoxide and steam to yield hydrogen having the general formula, in terms of weight proportion, of $[CuO]_3 \cdot [CrO_3] \cdot [ZnO]$, and formed by precipitating hydrated copper nitrate and zinc nitrate solutions containing $CrO_3$ or $Cr_2O_3$ with ammonia. The precipitate is dried, granulated and made into tablets such that the catalyst composition consists essentially of about 31.3% by weight copper oxide, 30.5% by weight zinc oxide and 38.2% by weight $Cr_2O_3$ or 49.7% by weight copper oxide, 17.8% by weight zinc oxide and 32.5% by weight $CrO_3$.

---

The invention relates to a method of producing a low-temperature catalyst for the conversion or reformation of carbon monoxide with steam by the joint precipitation and neutralization of zinc, copper and chromium compounds with a base.

One of the basic commercial methods of obtaining hydrogen which is necessary for the synthesis of ammonia and a number of various other products is the conversion of carbon monoxide with steam.

The object of the present invention is to provide an improved method for the production of a low-temperature catalyst of this nature consisting essentially of the oxides of copper, zinc and chromium.

The catalyst is obtained as a result of the reaction of the hydrated copper and zinc nitrates and an aqueous solution of chromic oxide (i.e. the anhydride of chromic acid) with a base, specifically aqueous ammonia solution. The concentration of the starting solution and of the precipitator is 15–30%. The precipitation takes place at a temperature of 31–81° C. and a pH of 6.0–6.9. The resulting precipitate of insoluble compounds of copper, zinc and chromium is filtered and washed, at a temperature which is the same as that of precipitation, to a content of $NO_3$ ions in the precipitate not greater than 0.5%. The precipitate is then dried at a temperature of 105–150° C. and is subjected to a heat treatment at a temperature of 250° C. for three hours, or at a temperature of 350° C. for one hour.

The resulting powder-like contact mass is mixed with a binding substance (graphite and a polysaccharide), after which it is granulated and made into tablets of the desired size.

EXAMPLE 1

28.4 liters of a solution of $Cu(NO_3)_2 \cdot 2H_2O$ (4.2 kg.),
32.6 liters of a solution of $Zn(NO_3)_2 \cdot 6H_2O$ (4.8 kg.), and
15 liters of a solution of $CrO_3$ (2.2 kg.)

are mixed and precipitated at a temperature of 41° C. with 6 liters of aqueous ammonia of a concentration of 23% and a pH of 6.0–6.9. The precipitate is filtered and washed with 80 liters of water. It is dried at a temperature of 150° C. and tempered at 250° C. for three hours. It is mixed with 2% by weight graphite, thereafter granulated with the assistance of a solution of a polysaccharide (0.5–1.5%); it is then dried at a temperature of 120° C. and is made into tablets of a size of 5 mm. x 5 mm.

The catalyst, in terms of the respective oxides, has the following composition:

|  | Percent |
|---|---|
| CuO | 31.3 |
| ZnO | 30.5 |
| $Cr_2O_3$ | 38.2 |

EXAMPLE 2

23.4 liters of a solution of $Cu(NO_3)_2 \cdot 3H_2O$ (7 kg.),
9.8 liters of a solution of $Zn(NO_3)_2 \cdot 6H_2O$ (3 kg.), and
8.4 liters of a solution of $CrO_3$ (2.5 kg.)

are mixed and are precipitated at a temperature of 41° C. with 7.1 liters of aqueous ammonia of a concentration of 23% and a pH of 6.0–6.9. The precipitate is filtered and washed with 80 liters of water. It is dried at a temperature of 150° C. and is tempered (i.e. held at the indicated temperature) at 250° C. for three hours. It is mixed with 2% by weight graphite and is then granulated with the assistance of a solution of a polysaccharide (0.5–1.5%); the product next is dried at a temperature of 120° C. and is made into tablets of a size of 5 mm. x 5 mm.

When analyzed in terms of the respective oxides, the catalyst produced has the following composition:

|  | Percent |
|---|---|
| CuO | 49.7 |
| ZnO | 17.8 |
| $CrO_3$ | 32.5 |

The resulting low-temperature catalyst is used in the well-known manner for the reformation of carbon monoxide with steam, followed by further removal of carbon monoxide from the synthesis gas by means of methanization.

We claim:

1. In a method of producing a low-temperature catalyst for the conversion of carbon monoxide with steam, said catalyst consisting essentially of the oxides of copper, zinc and chromium obtained by coprecipitation with aqueous ammonia from an aqueous solution of a mixture of the nitrates of copper and zinc with chromic oxide, the improvement which comprises washing the precipitate to reduce the nitrate-ion content thereof to not more than 0.5%.

2. The improvement defined in claim 1 wherein the weight of the nitrates in said solution is substantially four times the weight of said chromic acid.

References Cited

UNITED STATES PATENTS

| 1,809,978 | 6/1931 | Larson | 252—468 |
| 1,959,313 | 5/1934 | Vail | 23—233 |

DANIEL E. WYMAN, Primary Examiner

P. M. FRENCH, Assistant Examiner